United States Patent
Patel et al.

(10) Patent No.: US 12,072,464 B2
(45) Date of Patent: *Aug. 27, 2024

(54) SENSORS FOR DETECTING PRESENCE, OCCUPANCY, AND/OR MOTION AND RELATED SYSTEMS AND METHODS

(71) Applicant: Transform SR Brands LLC, Hoffman Estates, IL (US)

(72) Inventors: Shwetak N. Patel, Seattle, WA (US); Matthew Stephen Reynolds, Seattle, WA (US)

(73) Assignee: TRANSFORM SR BRANDS LLC, Hoffman Estates, IL (US)

(*) Notice: Subject to any disclaimer, the term of this patent is extended or adjusted under 35 U.S.C. 154(b) by 78 days.

This patent is subject to a terminal disclaimer.

(21) Appl. No.: 17/321,735

(22) Filed: May 17, 2021

(65) Prior Publication Data

US 2021/0341163 A1    Nov. 4, 2021

Related U.S. Application Data

(63) Continuation of application No. 16/229,432, filed on Dec. 21, 2018, now Pat. No. 11,009,244, which is a (Continued)

(51) Int. Cl.
| | |
|---|---|
| *G01V 8/12* | (2006.01) |
| *F24F 11/00* | (2018.01) |
| *F24F 11/30* | (2018.01) |
| *F24F 11/58* | (2018.01) |
| *F24F 11/65* | (2018.01) |

(Continued)

(52) U.S. Cl.
CPC .......... *G01V 8/12* (2013.01); *F24F 11/0001* (2013.01); *F24F 11/30* (2018.01); *F24F 11/58* (2018.01); *F24F 11/65* (2018.01); *G01V 8/10* (2013.01); *G05B 15/00* (2013.01); *G05B 15/02* (2013.01); *F24F 2120/10* (2018.01)

(58) Field of Classification Search
CPC ....... F24F 11/001; F24F 11/0034; G01V 8/10; G01V 8/12; G05B 15/00; G05B 15/02
See application file for complete search history.

(56) References Cited

U.S. PATENT DOCUMENTS

| | | | | |
|---|---|---|---|---|
| 5,461,231 A | * | 10/1995 | Sugimoto | ............ G08B 13/191 250/342 |
| 11,009,244 B2 | * | 5/2021 | Patel | .................... F24F 11/0001 |

(Continued)

OTHER PUBLICATIONS

International Search Report and Written Opinion for PCT/US2015/060982, mailed Aug. 19, 2016. (8 pages).

*Primary Examiner* — Feifei Yeung Lopez
(74) *Attorney, Agent, or Firm* — McAndrews, Held & Malloy, Ltd.

(57) ABSTRACT

A motion sensor assembly may include a cover plate configured to be mounted to an electrical box. The cover plate may include a front surface configured to face away from the electrical box and a rear surface opposite the front surface. The cover plate may further include an aperture configured to receive a toggle or rocker type switch. A motion sensor may be coupled to the cover plate. A power source and processor may be operably coupled to the motion sensor. Furthermore, the processor may be operably coupled to a communication device.

20 Claims, 7 Drawing Sheets

Related U.S. Application Data continuation of application No. 14/943,192, filed on Nov. 17, 2015, now Pat. No. 10,161,646.

(60) Provisional application No. 62/080,756, filed on Nov. 17, 2014.

(51) Int. Cl.
    *G01V 8/10* (2006.01)
    *G05B 15/00* (2006.01)
    *G05B 15/02* (2006.01)
    *F24F 120/10* (2018.01)

(56) References Cited

U.S. PATENT DOCUMENTS

| | | | |
|---|---|---|---|
| 2001/0038332 A1 | 11/2001 | Rodgers et al. | |
| 2002/0134849 A1* | 9/2002 | Disser | G05D 23/1902 236/47 |
| 2003/0065472 A1 | 4/2003 | Eckel et al. | |
| 2004/0009700 A1 | 1/2004 | Patel | |
| 2004/0155763 A1* | 8/2004 | Lin | B60C 23/0408 340/447 |
| 2004/0267385 A1 | 12/2004 | Lingemann | |
| 2006/0000971 A1 | 1/2006 | Jones et al. | |
| 2009/0027574 A1* | 1/2009 | Edwards | G08B 13/193 349/1 |
| 2009/0072985 A1 | 3/2009 | Patel et al. | |
| 2009/0115604 A1 | 5/2009 | Thomas et al. | |
| 2009/0240380 A1 | 9/2009 | Shah et al. | |
| 2009/0321471 A1 | 12/2009 | Alcaraz Garcia | |
| 2010/0231421 A1 | 9/2010 | Rawls-Meehan | |
| 2011/0095622 A1 | 4/2011 | Feldstein et al. | |
| 2011/0260880 A1* | 10/2011 | Dean | G08B 13/19 362/183 |
| 2012/0085831 A1 | 4/2012 | Kopp | |
| 2012/0312576 A1 | 12/2012 | Shivell et al. | |
| 2013/0032594 A1 | 2/2013 | Smith | |
| 2013/0073093 A1 | 3/2013 | Songkakul | |
| 2013/0184880 A1 | 7/2013 | McMahon | |
| 2013/0321637 A1* | 12/2013 | Frank | H04N 5/33 348/152 |
| 2014/0005809 A1 | 1/2014 | Frei et al. | |
| 2014/0266669 A1 | 9/2014 | Fadell et al. | |
| 2014/0361875 A1 | 12/2014 | O'Hagan et al. | |
| 2015/0022620 A1 | 1/2015 | Siminoff | |
| 2015/0092466 A1* | 4/2015 | Earanky | F24F 11/30 363/126 |
| 2015/0099463 A1 | 4/2015 | Stuntebeck et al. | |
| 2015/0189725 A1* | 7/2015 | Karc | H05B 47/19 315/291 |
| 2015/0330652 A1 | 11/2015 | Kim | |
| 2016/0096054 A1 | 4/2016 | Busch et al. | |
| 2017/0055126 A1* | 2/2017 | O'Keeffe | H04W 4/21 |
| 2018/0145844 A1* | 5/2018 | Pera | H04L 12/2803 |

* cited by examiner ered. The profile presented by the printed circuit board 117 and associated components is low enough to accommodate the switch 121. The toggle mechanism of switch 121 extends through the central aperture 107 (see FIG. 1A) and may be accessible from the front surface 103. Accordingly, the assembly 100 need not interfere with the normal operation of the circuit controlled by the switch 121 and its associated toggle switch. An optional second cover plate 123 may be coupled to the cover plate 101 via one or more attachment mechanisms 125. The second cover plate 123 may also include a central aperture 127 and at least one mounting hole 129 so as to be mounted to an adjacent electrical box in place of a cosmetic light switch cover. In some embodiments, the motion sensor assembly 100 has a thickness of less than 1 centimeter. In other embodiments, the motion sensor assembly has a thickness of less than 5 millimeters.

SENSORS FOR DETECTING PRESENCE, OCCUPANCY, AND/OR MOTION AND RELATED SYSTEMS AND METHODS

CLAIM OF PRIORITY

This patent application claims priority to and claims benefit from the U.S. Provisional Patent Application Ser. No. 62/080,756, filed on Nov. 17, 2014. The above stated application is hereby incorporated herein by reference in its entirety.

TECHNICAL FIELD

The present disclosure relates generally to sensors for detecting presence, occupancy, and/or motion.

BACKGROUND

There are many existing types of motion sensors that are available for security applications, including for example ceiling-mounted passive infrared sensors. Such sensors are typically hard-wired into a security system using a multi-conductor cable, which provides power to the sensor and carries a signal indicating the presence of motion back to a central alarm panel. Some variations of existing sensors include a lamp which illuminates the area in response to detected motion. Still further variations of existing sensors include battery powered sensors which indicate the presence of motion using a radio frequency signal carried over-the-air from the sensor to an alarm panel, or to a relay which enables a lamp to be actuated in response to detected motion.

BRIEF DESCRIPTION OF THE DRAWINGS

The various features and advantages of the present disclosure may be more readily understood with reference to the following detailed description taken in conjunction with the accompanying drawings, wherein like reference numerals designate like structural elements.

DETAILED DESCRIPTION

Embodiments of a sensor assembly are disclosed, that enable easy consumer installation as well as a long service life. In some embodiments, the motion sensor assembly may be configured for attachment to an electrical switch box or electrical box as a replacement for a cosmetic light switch cover. The motion sensor assembly may be configured for wired and/or wireless communication and may have its own power supply, allowing for simple setup and installation.

Physical Arrangement of Motion Sensor Assembly

Figure 1A:
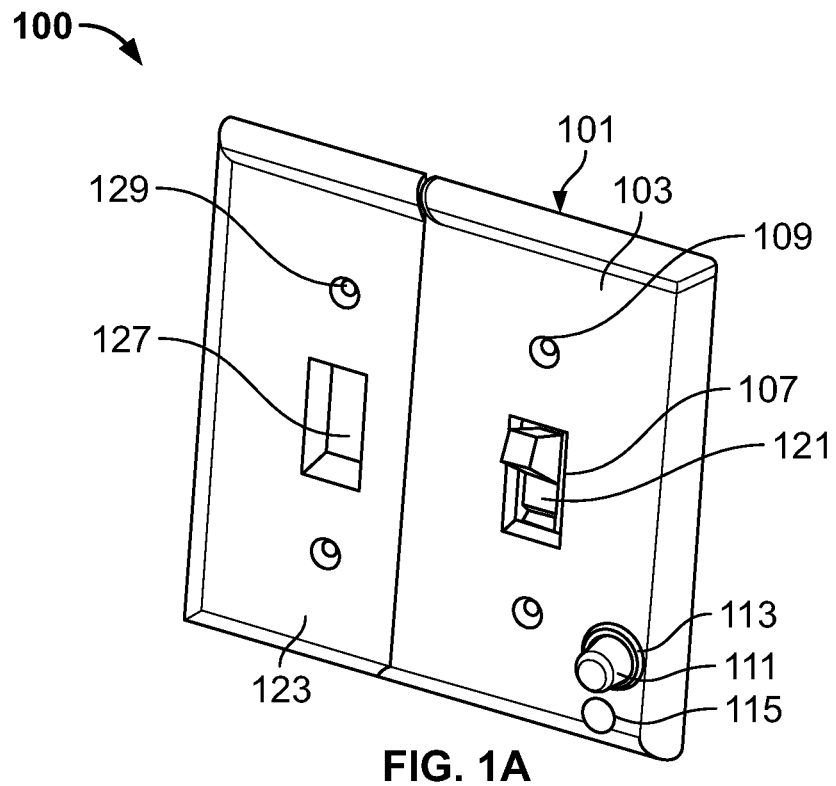
FIG. 1A illustrates a front perspective view of a motion sensor assembly.
Figure 1B:
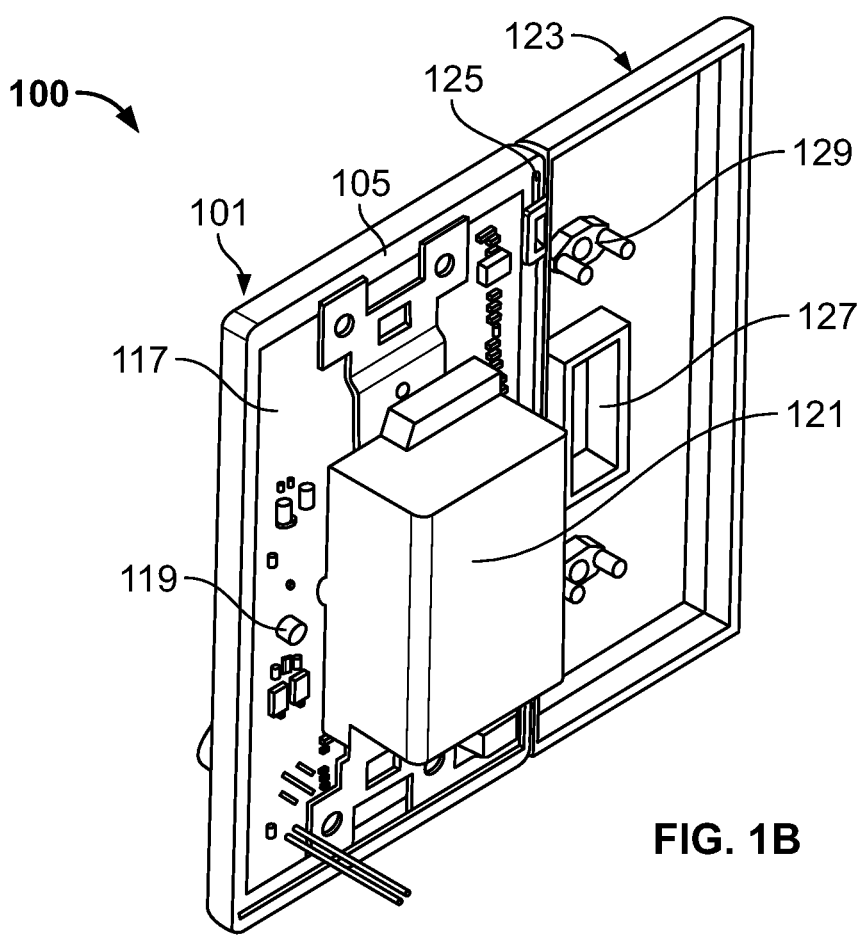
FIG. 1B is a rear perspective view of the motion sensor assembly of FIG. 1A.

FIGS. 1A and 1B illustrate front and rear perspective views, respectively, of a motion sensor assembly 100. Referring to FIGS. 1A and 1B, together, the motion sensor assembly 100 may include a cover plate 101 having a front surface 103 and a rear surface 105 (FIG. 1B). The cover plate 101 may include at least one central aperture 107 and at least one mounting hole 109 for mounting the assembly 100 to an electrical box in place of a cosmetic light switch cover. A lens 111 may extend from the front surface 103 and may house a motion sensor 113 behind the lens 111. A light emitting diode 115 or other light source or indicator may be visible on the front surface 103 of the cover plate 101.

Referring now to FIG. 1B, a printed circuit board 117 may be mounted adjacent to the rear surface 105 of the cover plate 101. A user interface element 119 (e.g., a push-button) extends from the rear surface 105. As illustrated, the motion sensor assembly 100 may be placed over a switch 121, which may be, for example, a pre-existing electrical switch or a new electrical switch. Accordingly, in an embodiment where the switch 121 is pre-existing, the user may install the assembly 100 without removing the switch 121 from the electrical box (not shown) to which it is typically mount- Apertures In some embodiments, the central aperture 127 may be a rectangular hole configured to fit around the toggle of a toggle or rocker type switch. In other embodiments, the central aperture may be a rectangular hole configured to fit around the switch mechanism of a Lutron- or Decora-type switch. In still further embodiments, the central aperture may be a circular hole adapted to pass the shaft of a rotary dimmer switch. In other embodiments, the at least one mounting hole 129 may be omitted in favor of at least one captive screw, or in favor of at least one friction fit post or boss which may be adapted to friction fit into the receiving screw threads on the switch 121 or an electrical box.

The motion sensor assembly 100 may contain a central aperture 107 that may be configured to fit an electrical outlet or jack. Accordingly, the motion sensor assembly 100 may be provided with the attachment mechanism 125 so as to permit the use of additional cover plates 123 that accommodate different types of electrical outlets, such as ordinary dual three-prong outlets, as well as Decora-style outlets, telephone outlets, type F connector outlets as are ordinarily used for cable television, Ethernet jacks, or other types of jacks. In such cases, the terms "electrical box" and "multiple gang electrical box" may also be understood to mean any metal or plastic enclosure which may be used to enclose such electrical switches, outlets, or jacks.

In some embodiments, the motion sensor assembly 100 contains multiple central apertures 107, 127 positioned so that each central aperture fits around one of a plurality of switches in a multiple-gang electrical box. In other embodiments, the motion sensor assembly 100 contains one central aperture 107 to fit around one switch, along with an attachment mechanism 125 for attachment to one or more additional cover plates 123. The additional cover plates or sections themselves may or may not contain additional motion sensors. In some embodiments, the additional cover plate 123 attaches to the side of the first cover plate 101. In this manner, a consumer may be provided with a single motion sensor assembly 100 as well as any number of additional cover plates 123 to extend the single motion sensor assembly 100 to cover each switch of a multiple gang electrical box at low additional cost. The attachment mechanism 125 may include at least one alignment pin. In other embodiments, the attachment mechanism 125 may include at least one friction-based or spring-loaded mechanical clasp. In still further embodiments, the attachment mechanism 125 may employ the one or more mounting screws or friction fit posts which attach the motion sensor assembly 100 to screw holes in the switch or electrical box. In some embodiments, the motion sensor assembly 100 includes a central aperture 107 of one type (such as a rectangular hole to fit a toggle-type switch), along with one or more additional cover plates 123 having differing types of central apertures 127, to accommodate a multiple gang electrical box containing different types of switches. In some embodiments, the motion sensor assembly 100 may have a thickness substantially below 1 centimeter, or in some embodiments below 5 millimeters.

Lenses

The lens 111 (FIG. 1A) may take any of many suitable forms, depending on the particular motion sensor 113 selected. In some embodiments, a semiconductor motion sensing element such as a pyroelectric element may be provided with a lens 111 so as to focus incident infrared radiation from a distance on to the pyroelectric element. In some embodiments, the lens 111 may be replaced with a focusing mirror. In other embodiments, the lens 111 may be a multi-faceted lens such that the amplitude of the voltage produced by the pyroelectric element varies as a person moves across the field of view of the sensor, in the process transiting from one facet of the lens 111 to another. In still further embodiments, the lens 111 may be a Fresnel lens.

The lens 111 may be fabricated from, or covered by, a material which may be substantially opaque to visible light yet relatively transparent to infrared radiation in a desired band of infrared wavelengths. In some cases, the desired band of infrared wavelengths is from 5 microns to 15 microns, for example, which corresponds to those wavelengths that are emitted by humans or objects near human body temperature, with an average infrared wavelength of around 9.4 microns. In some embodiments, the lens 111 and motion sensor 113 may be located within the cover plate 101 of the motion sensor assembly 100. The lens 111 may be mounted such that it is substantially flush with the cover plate 101 of the motion sensor assembly 100. In further embodiments, the lens 111 may be co-molded or otherwise fused to the cover plate 101 of the motion sensor assembly 100. In still further embodiments, the lens 111 may be fabricated from a single piece of material that also serves as the cover plate 101 of the motion sensor assembly 100.

Motion Sensors

While various embodiments described herein include passive infrared sensors such as pyroelectric semiconductor sensors, in other embodiments, the system may include multiple different types of motion sensors 113. Representative examples of other sensors include radar sensors. Radar sensors emit a radio frequency signal from an antenna which may be part of the motion sensor assembly 100. For example, the antenna may include a patch antenna or an array of multiple patch antennas integrated with a printed circuit board that may be part of the motion sensor assembly 100. In certain embodiments, the printed circuit board containing the radar sensors (e.g., antenna(s)) may be the same printed circuit board that carries the energy source (e.g., a battery) and the processor (e.g., a microcontroller). In some embodiments, the radar sensor's antenna may be connected to a transmitter and a receiver which are implemented using discrete components, while in other embodiments, the radar sensor's antenna may be connected to a single-chip (monolithic) receiver/transmitter circuit. The transmitter may be implemented using a dielectric resonator stabilized oscillator employing a gallium arsenide field effect transistor. The receiver may be implemented using a mixer diode such as silicon or gallium arsenide Schottky diode. In some embodiments, the receiver may be a homodyne detector, wherein the output of the mixer diode may be a product of a local oscillator consisting of a sampled transmitted signal with a received signal that includes the reflection(s) of the transmitted signal from one or more objects in the environment. In such embodiments, the output of the receiver may be a baseband signal which includes frequency components including the Doppler shift due to motion of one or more objects in the environment. In such cases, the aforementioned amplification, bandpass filtering, and/or Fourier transform processing may be employed on the output of the receiver so as to discriminate valid motion events from unwanted motion events. Any of the other suitable techniques described herein for discrimination of motion events may be applied to the receiver output signal.

In further embodiments, the radar sensor may be implemented using a more sophisticated approach, such as a pulsed Doppler radar, a time gated pulsed radar, an ultra-wideband radar, or a frequency modulated continuous wave (FMCW) radar. Pulsed radars may have some advantages in battery powered motion sensors, in that the average power consumed by the pulsed radar may be less than the peak power consumed. Such a duty cycle factor may be employed to reduce the average power consumed by the sensor to produce a longer battery life.

Additional Sensors

The motion sensor assembly 100 may comprise additional types of sensors producing additional sensor outputs co-located with the motion sensor 113. For example, the additional sensors may include temperature sensors, light sensors, noise sensors, humidity sensors, sensors of hazardous gases such as smoke or carbon monoxide, and/or sensors of particulate matter in the air. In other embodiments, the additional sensors may include moisture or wetness sensors, for example an impedance-based wetness sensor. In such embodiments, the additional sensor outputs may be used in combination with the output of the motion sensor 113 to enhance the discrimination between valid motion events and unwanted motion events. In one example, the output of a temperature sensor may be used in combination with a passive infrared sensor to provide a gain or sensitivity factor in the determination of a threshold or high/low values for a window comparator that may be compared with the instantaneous output of the passive infrared sensor.

The assembly 100 may be configured to record readings from the additional sensors based on a motion event that may be detected with the motion sensor 113. For example, in response to a detected motion event, the reading of an additional sensor (e.g., a temperature sensor, a digital camera, etc.) may be recorded and/or time-stamped. As a result, readings from the additional sensors may increase in frequency in response to detected motion, and conversely the readings may decrease in frequency in response to no detected motion.

Printed Circuit Boards

The printed circuit board 117 described above may be disposed over or adjacent to the rear surface 105 of the cover plate 101 of the motion sensor assembly 100. In some embodiments, the printed circuit board 117 may be designed so as to expose only a non-conductive surface toward the interior face, facing the electrical box 121. In other embodiments, the printed circuit board 117 may be insulated via the deposition of an insulating coating or a solder mask layer. In further embodiments, a thin plastic film may be applied to the printed circuit board 117 so as to form an insulating layer. In any of the foregoing arrangements, the non-conductive surface or the insulating coating or layer may protect the printed circuit board 117 and/or other elements of the motion sensor assembly 100 from coming into unwanted electrical contact with the terminals of the switch 121, or other existing electrical wiring inside the box enclosing the switch 121.

Figure 2:
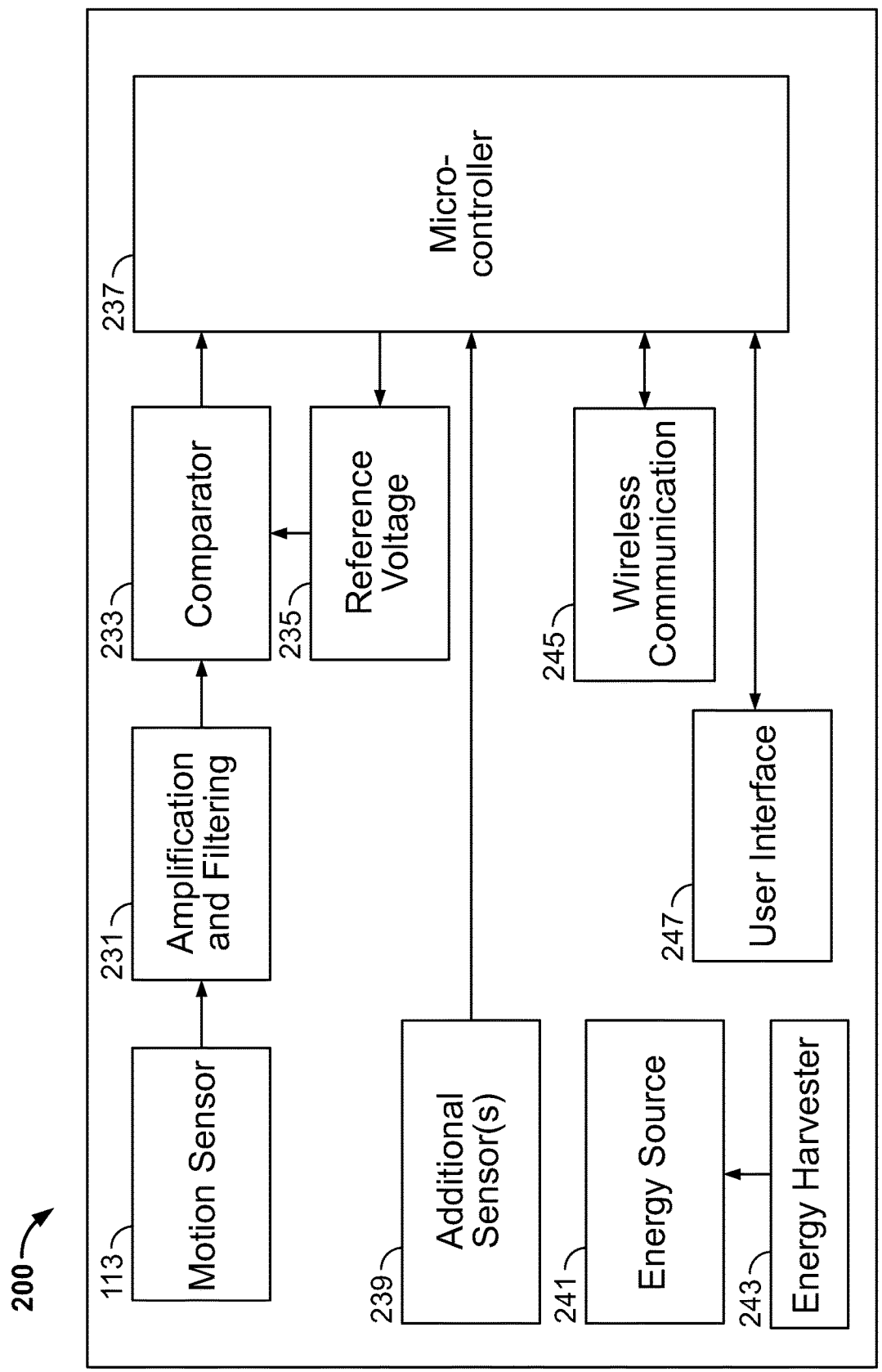
FIG. 2 is a schematic diagram of one embodiment of the motion sensor assembly of FIGS. 1A and 1B.

FIG. 2 shows a schematic diagram 200 of one embodiment of the motion sensor assembly 100. As shown, the motion sensor 113 may be coupled to an amplification and filtering circuit 231, which in turn may be coupled to a comparator 233. The comparator 233 may be also coupled to a reference voltage 235 for comparison to the output of the amplification and filtering circuit 231. The output of the comparator 233 may be coupled to a microcontroller 237, which in some embodiments may provide the reference voltage 235. One or more additional sensors 239 (e.g., temperature sensors, moisture sensors, etc.) may also be coupled to the microcontroller 237. As shown, the motion sensor assembly 100 may further include an energy source 241, which may be coupled to an optional energy harvester 243 (e.g., a photovoltaic cell). A wired and/or wireless communication device 245 (e.g., that includes generates, supports, and/or facilitates a wired and/or wireless communication link) and a user interface 247 are also in communication with the microcontroller 237. The energy harvester 243 may supplement or replace the power provided by a battery.

Energy Sources

In some embodiments, the energy source 241 of the motion sensor assembly 100 includes a battery, for example at least one lithium coin cell battery, such as a type CR2450 battery made by Panasonic Inc. or other manufacturers. In other embodiments, other battery types are used, including the commonly available AAA, AA, 1/2AAA, etc. In further embodiments, the energy source 241 may be coupled to an energy harvester 243, e.g., one or more photovoltaic cells disposed on the front or sides of the motion sensor assembly 100 so as to be illuminated by available light. In still further embodiments, the motion sensor assembly 100 may be powered at least in part by other energy sources, such as by receiving power via an electrical connection to the electrical wiring contained within the electrical box, and/or by harvesting energy from thermal gradients, and/or by harvesting energy from ambient electromagnetic radiation, and/or by harvesting energy from the magnetic field produced by current-carrying wires within the electrical box. The battery in the motion sensor assembly 100 may be a rechargeable battery recharged at least in part by one or more of the aforementioned energy sources. In further embodiments, the motion sensor assembly 100 may be powered by a different type of energy source 241 such as a capacitor, a supercapacitor or an ultracapacitor which may be charged at least in part by one or more of the aforementioned energy sources.

The motion sensor 113 may include a passive infrared sensor such as a pyroelectric semiconductor which at least in part provides a motion signal (e.g., a signal that corresponds to detected motion). In some embodiments, the pyroelectric sensing element may be formed from two elements wired in opposing series, such that the pyroelectric sensing element may be differentially sensitive to gradients in the infrared energy impinging upon the pyroelectric sensing element. The output of the motion sensor 113 may be coupled to the amplification and filtering circuit 231. The amplification and filtering circuit 231 may include, for example, a field effect transistor (such as a junction FET or a MOSFET) or other high impedance amplifying device to amplify a relatively low power signal from the pyroelectric sensing element to yield the motion signal. In some embodiments, the amplification and filtering circuit 231 includes an integrated circuit operational amplifier to yield the motion signal. In some embodiments the amplification and filtering circuit 231 may be part of an integrated circuit also containing other components of the device such as the comparator 233, the source of the reference voltage 235, and/or the microcontroller 237. In further embodiments, the amplifying circuit 231 may be AC-coupled, for example with a circuit element such as a capacitor, so as to introduce a high pass pole in the frequency response of the amplifying circuit and to reject direct current offset voltages or currents. In further embodiments, the amplification and filtering circuit 231 may include a band pass filter with a passband frequency range corresponding approximately to the range of signal frequencies expected due to the motion of persons, or other objects. Such filters may be designed to exhibit a frequency response which tends to reject the range of signal frequencies corresponding to the motions of animals such as dogs or cats which may otherwise cause unwanted triggering of the motion sensor (e.g., an invalid triggering or false positive).

Sensor and Signal Conditioning

The comparator 233 compares the output of the motion sensor 113 (or the sensor output of an amplification/filtering circuit 231 as described above), with the reference voltage 235. In some embodiments, the reference voltage 235 may be derived from a resistive voltage divider (such as may be implemented with fixed-value resistors, or by a potentiometer). In other embodiments, the reference voltage 235 may be derived from a digital-to-analog converter, or a digitally controlled resistor array, or a digital potentiometer. In further embodiments, the reference voltage 235 may be derived from a resistive voltage divider having at least one resistive element which may be switched by a transistor such as a field effect transistor or a bipolar junction transistor so as to produce a plurality of different reference voltages. In further embodiments, the reference voltage 235 may be provided by a voltage regulator, a bandgap reference circuit, or a diode based voltage reference such as a Zener diode voltage reference. In still further embodiments, the comparator 233 may be a window comparator such that the comparator's output changes state in response to the sensor output voltage being outside of a high voltage/low voltage window. In some cases the comparator 233 may be integrated into the same integrated circuit as the microcontroller 237, the circuit producing the reference voltage 235, or the amplification and filtering circuit 231.

The reference voltage 235 and/or the comparator window may be selected to yield a range of amplitude sensitivities which tends to reject the range of motion signal amplitudes corresponding to the motions of animals such as dogs or cats which may otherwise cause unwanted triggering of the motion sensor. In some cases, the detection of valid motion events may refer to the motion of one or more persons in an area, and the detection of unwanted motion events may refer to the motion of animals such as dogs or cats. The detection of unwanted motion events may also refer to false triggering of the motion sensor due to changes in ambient temperature or airflow, and/or the motion of inanimate objects in or near the detection region. For example, the motion of objects such as curtains or shades caused by an airflow may constitute a false triggering event. In other cases, the motion of robotic or mechanical objects may constitute a false triggering event, for example the motion of a robotic vacuum cleaner such as a Roomba (manufactured by iRobot Inc.) through a space.

Digital Signal Conditioning

In some embodiments, the aforementioned digital control of the reference voltage 235 may be provided by a microprocessor or a microcontroller 237 such as the MSP430 series made by Texas Instruments Inc, or an ARM architecture microcontroller made by a number of vendors such as Atmel, ST Microelectronics, Texas Instruments, Samsung, Nuvoton, NXP, etc. The microcontroller 237 may be provided with internal peripheral circuitry that performs one or more of the functions of the reference voltage 235, the comparator 233, and/or the amplification and filtering circuit 231. In such a case, the word "connected to" may refer to an internal connection within the microcontroller 237 that routes signals within the circuitry of the microcontroller 237.

Accordingly, the output of the comparator 233 may be connected to a digital input of the microcontroller 237. In some embodiments, the digital input of the microcontroller 237 may be configured so as to cause an interrupt in response to a detected motion event due to the amplified and/or filtered motion signal exceeding the reference voltage 235, or in response to the amplified and/or filtered motion signal being outside a high/low voltage window of a window comparator. In some cases, the microcontroller 237 may process the digital signal by, e.g., counting the number of occurrences of state changes in the digital input of the microcontroller 237 within a predetermined period of time. In other embodiments, the microcontroller's firmware does not consider a motion event to have taken place until a predetermined number of state changes has taken place. In further embodiments, the number of required state changes, and/or the associated period of time may be set via a control signal from an external processor 451 that may be in wired or wireless communication with the microcontroller 237. In some embodiments, the control signal may be transported from an external processor 451 via a computer network such as the Internet.

Figure 3:
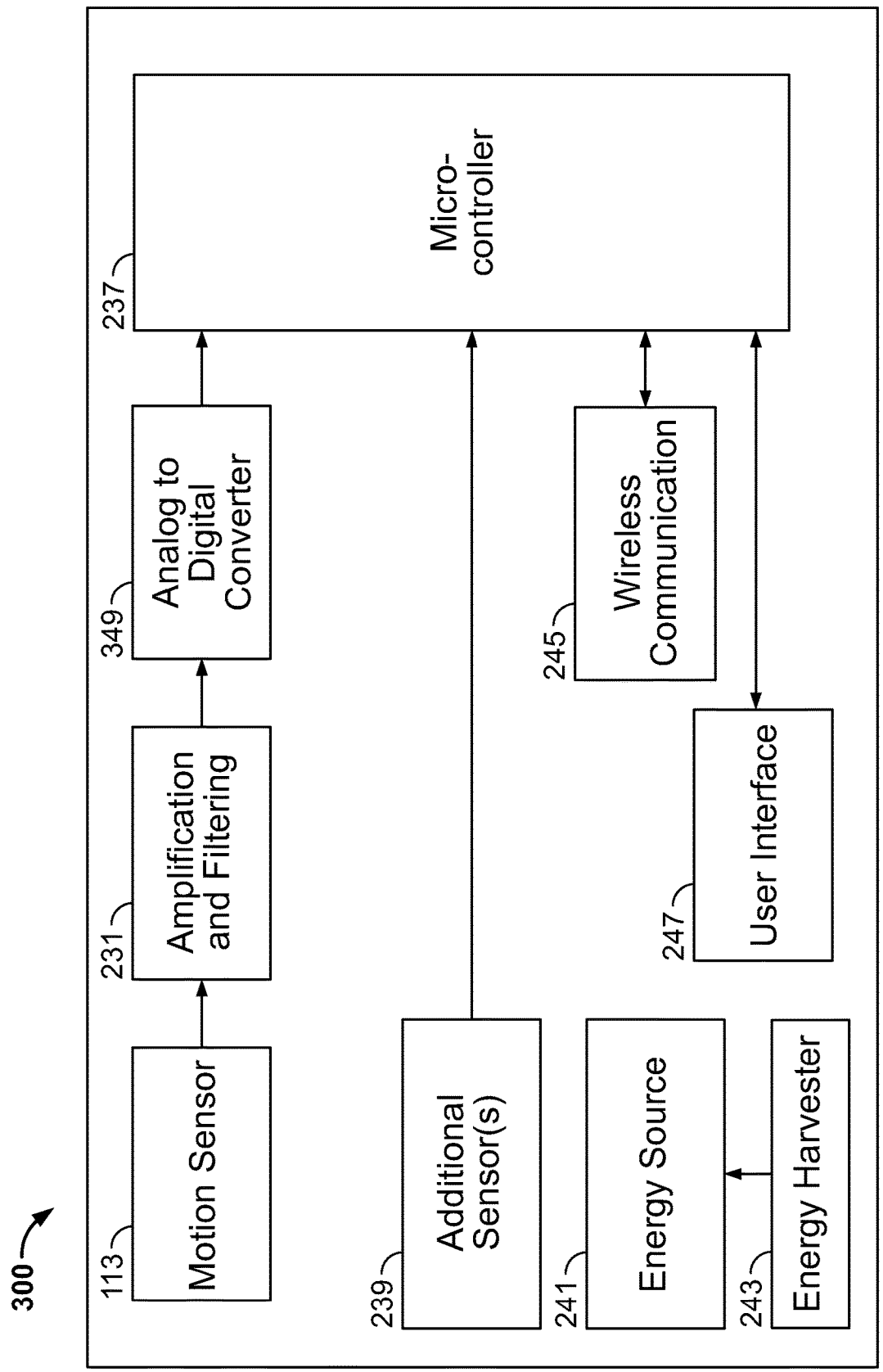
FIG. 3 is a schematic diagram of another embodiment of the motion sensor assembly of FIGS. 1A and 1B.

FIG. 3 shows a schematic diagram 300 of another embodiment of the motion sensor assembly 100. Many of the components of diagram 300 are similar to those described above with reference to the diagram 200 of FIG. 2. However, in FIG. 3, the comparator 233 and reference voltage 235 are replaced with an analog-to-digital converter 349. The analog-to-digital converter (ADC) 349 may be external to the microcontroller 237. In such cases, the microcontroller 237 may use the ADC 349 to sample the motion signal and to perform a comparison between the sampled value of the motion signal and a threshold value or a high/low threshold window forming amplitude comparison parameters. In some cases, the amplitude comparison parameters may be set via a control signal from an external processor 451 that may be in wired or wireless communication with the microcontroller 237. In some embodiments, the control signal may be conveyed from an external processor 451 via a computer network such as the Internet. In some embodiments, the analog-to-digital converter 349 may be part of an integrated circuit containing the microcontroller 237.

In further embodiments, the microcontroller 237 may perform a series of signal processing steps to digitally process the motion signal. Such signal processing steps may include digital filtering, e.g., by a finite impulse response filter or by an infinite impulse response filter. The output of the signal processing steps may then be compared with a threshold value or window as previously described.

In other embodiments, the signal processing steps may include a Fourier transform operation to convert the motion signal from the time domain to the frequency domain. For example, the frequency domain representation of the motion sensor signal may be used to determine whether a valid motion event has occurred. In some embodiments, the values of one or more frequency bins in the Fourier domain are used to discriminate between valid motion events and invalid events, such as those caused by animals. In some embodiments, the selection of frequency bins may be carried out by an external processor 451 and communicated to the microcontroller 237 via any of the aforementioned wired or wireless networks, and/or the Internet.

The foregoing signal processing steps may include multiplication by a gain factor either directly or inversely proportional to the ambient temperature as measured by a temperature sensor. In some embodiments, the temperature sensor may be located proximate to the motion sensor 113. In some embodiments, the temperature sensor may be a semiconductor temperature sensor, and in other embodiments, the temperature sensor may be a thermally sensitive resistor or thermistor. In some embodiments, the ambient temperature may be used to adjust the reference voltage 235, or to adjust one or more thresholds applied to the output of the analog-to-digital converter 349 either immediately or subsequent to one or more of the signal processing steps previously described.

User Interface

The system may include one or more user interface elements 247, for example an indicator disposed to signal to a user one or more conditions of the motion sensor assembly 100. The signaled conditions may include (1) a battery charge level, (2) whether or not the motion sensor assembly 100 may be in communication with an external processor 451, (3) whether a candidate motion event has been detected, and/or (4) whether a valid motion event has been detected. In some embodiments, the indicator may include one or more light emitting diodes (LEDs) (e.g., the light emitting diode 115 of FIG. 1A). The indicator may include one LED having two or more colors. In other embodiments, the indicator may include a beeper that produces an audible signal, which may further include an audible tone or speech produced under the control of the microcontroller 237. In still further embodiments, the indicator may include a liquid crystal display (LCD), which may be capable of symbolic display, alphanumeric display and/or graphic display. In some embodiments, the indicator may include an organic light emitting diode (OLED) display, which may also present symbolic display, an alphanumeric display and/or a graphic display.

The user interface element 247 may be capable of accepting input from a user. Accordingly, the user interface element may include an input device, e.g., one or more switches or push buttons (e.g., the user interface element 119 of FIG. 1B), or a capacitive touch sensor. In some embodiments, a push button may be used to signal to the microcontroller 237 that the user wishes to pair, or establish connection between, the motion sensor assembly 100 and an external processor 451. The push button may be disposed to cause the microcontroller 237 to transmit a specific message over a wireless communication device 245 indicating the presence and unique identifier of the specific motion sensor assembly 100 and its receptiveness to being paired with a particular external processor 451. In some embodiments, the unique identifier may be a factory assigned unique identifier and stored in a memory accessible to the microcontroller 237. In other embodiments, the unique identifier may be a random number generated by a random number generation algorithm running in the microcontroller 237.

One or more switches and/or a capacitive touch sensor may be employed to provide a multi-function user input capability for the motion sensor assembly 100. In some embodiments, the one or more switches and/or the capacitive touch sensor are used to adjust at least one numeric value, for example by disposing the switches to increment or decrement at least one numeric value, or by configuring the capacitive touch sensor as a slider to adjust at least one numeric value to one of a plurality of values. In any of these embodiments, at least one numeric value may be communicated from the motion sensor assembly 100 to the external processor 451. The external processor 451 may further communicate the at least one numeric value to adjust an operating state of a system such as an illumination system or a heating, ventilation, or air conditioning (HVAC) system. In some embodiments, multiple such numeric values may be adjusted, and the selection of which value may be to be adjusted may be accomplished using a menu system visible to the user on a display as previously disclosed.

Wireless Communication

The motion sensor assembly 100 may include a microcontroller 237 which may be at least periodically in communication with an external processor 451. In such cases, the communication may be carried by any of the well-known wired or wireless networking approaches. In some cases, the communication may be carried by a standard low power network such as an IEEE 802.15.4 network, a Bluetooth low energy or Bluetooth Smart network, a 6lowpan network, Zigbee network, or a Z-Wave network. In particular embodiments, a low-power IEEE 802.11 (WiFi) wireless transceiver may be integrated in the motion sensor assembly 100.

The foregoing communication may be carried by a high frequency radio signal in the band of 1-30 MHz which may be emitted by a transmitter that may be part of the motion sensor assembly 100. The high frequency radio signal may be received by a receiver which may be connected to the power wiring in a building or structure. In such cases, there may be no direct electrical connection between the motion sensor assembly 100 and the power wiring in the building or structure. Instead the signal emitted by the high frequency transmitter may be coupled electromagnetically across an air gap from the motion sensor assembly 100 to the power wiring in the electrical box, and further coupled along the power wiring to a remote location where a receiver may be connected to the power wiring. In such cases, the receiver connected to the power wiring may serve as a gateway which receives digital data packets from one or more motion sensor assemblies and further processes and/or further forwards those packets to an external processor 451. The motion sensor assembly 100 may contain both a high frequency transmitter utilizing the power wiring as a receiving antenna, as well as a standard low power network transmitter and/or receiver such as an IEEE 802.15.4 network, a Bluetooth low energy or Bluetooth Smart network, a 6lowpan network, a Zigbee network, or a Z-Wave network.

In some cases, a high frequency radio transmitter may be implemented using binary frequency shift keying at a carrier frequency of 13.56 MHz, a bit rate of approximately 5 kilobits per second, and with a frequency deviation of up to +/−7 kHz. A digital signal indicating whether to send a first frequency or a second frequency may be produced by the same microcontroller 237 used to process the motion sensor signals as herein described.

A single antenna may be used for each type of wireless communication, for example ceramic chip antennas or printed circuit antennas such as printed inverted-F antennas (PIFAs) for frequency bands exceeding 100 MHz, and for example printed coil antennas such as printed spiral coils for frequency bands below 100 MHz. In other embodiments, a single antenna structure may serve multiple frequency bands through the use of a diplexer network and/or multiple feed points on the antenna structure. In further embodiments, the system may include a dual-band printed spiral antenna configured to operate simultaneously in the UHF frequency band of 902-928 MHz, the HF frequency band of 13.56 MHz, or the unlicensed frequency band of 2400-2483 MHz. In such an embodiment, the printed spiral antenna may be fabricated around the outer periphery of the aforementioned printed circuit board that may be a component of the motion sensor assembly 100.

Processing Digital Data

In some embodiments, the external processor 451 may be a physical computer disposed at some distance from the motion sensing assembly 100. In other embodiments, the external processor 451 may be one or more virtual machine instances running in a cloud service such as Amazon Web Services provided by Amazon, or the Azure cloud service provided by Microsoft. In further embodiments, the external processor 451 may be a mobile device such as an Android or iOS smartphone.

Classification of Motion Events—Valid Motion Events and Unwanted Motion Events

The aforementioned microcontroller 237 may implement a queue of one or more candidate motion events (as determined by the triggering of the comparator or the sampled values exceeding a threshold or window) in an internal memory such as a static RAM, a dynamic RAM, or a flash memory. In some embodiments, this queue of candidate motion events may be processed using a discrimination algorithm such as a matched filter or a correlation operation with a predetermined or expected pattern of motion sensor outputs. Such an algorithm may be applied to the candidate motion events to discriminate between valid motion events and unwanted or invalid motion events such as those caused by animals. In some embodiments, the algorithm may be implemented in firmware within the microcontroller 237. In other embodiments, the algorithm itself, or its operating parameters (such as the aforementioned predetermined pattern) may be received by the microcontroller 237 from an external processor 451. In still further embodiments, the microcontroller 237 may communicate the queue of candidate motion events via a network to an external processor 451 so that the external processor 451 may execute the discrimination algorithm to discriminate between valid motion events and unwanted motion events.

In some embodiments, the discrimination algorithm may include a support vector machine (SVM) which has previously been trained using previously identified or labeled valid and/or invalid queues of motion events obtained in previous testing by the manufacturer or user of the motion sensor assembly 100. In other embodiments, the discrimination algorithm may include a clustering algorithm such as k-nearest neighbors (KNN).

Combining Multiple Queues of Candidate Motion Events for Discrimination

In further embodiments, two or more queues of candidate motion events may be jointly processed by classification algorithms such as the aforementioned SVM or KNN approaches. The processing approach may improve the probability of detecting valid motion events while reducing the probability of detecting unwanted motion events. In some embodiments, the two or more queues of candidate motion events are obtained at different time intervals and derived from a single motion sensor assembly 100. In other embodiments, the two or more queues of candidate motion events are obtained during at least partially overlapping time intervals from two or more motion sensor assemblies disposed in two or more different locations. For example, the two or more different locations may be disposed in the same room of a building. In other embodiments, the two or more different locations are in distinct rooms of a building. In still further embodiments, the two or more different locations share at least partial visibility of the same area such that the coverage areas of the two or more motion sensor assemblies at least partially overlap.

In a representative embodiment, a Markov chain model such as a hidden Markov model (HMM) processes a series of one or more queues of candidate motion events. For example, Markov chain model may be used to discriminate motion which may be largely confined to a single room of a building, or largely confined to the coverage area of a single sensor, from motion over a larger area such as multiple rooms of a building or the coverage area of multiple sensors. In some cases, the transition of a motion signal corresponding to a moving object from one coverage area to another constitutes a valid motion event, while motion signals corresponding to a moving object within a single room or building constitutes an unwanted motion event.

The aforementioned algorithms and models (such as the SVM, KNN, or HMM) may be embodied in software residing in a processor (e.g., a microcontroller) which may be disposed in the motion sensor assembly 100. In other embodiments, the aforementioned algorithms and models may be embodied in software residing in a remotely located processor such as a remote computer server, or a virtual machine running in a cloud service provider such as those previously disclosed.

Example Applications of the Motion Sensor Assembly

Figure 4:
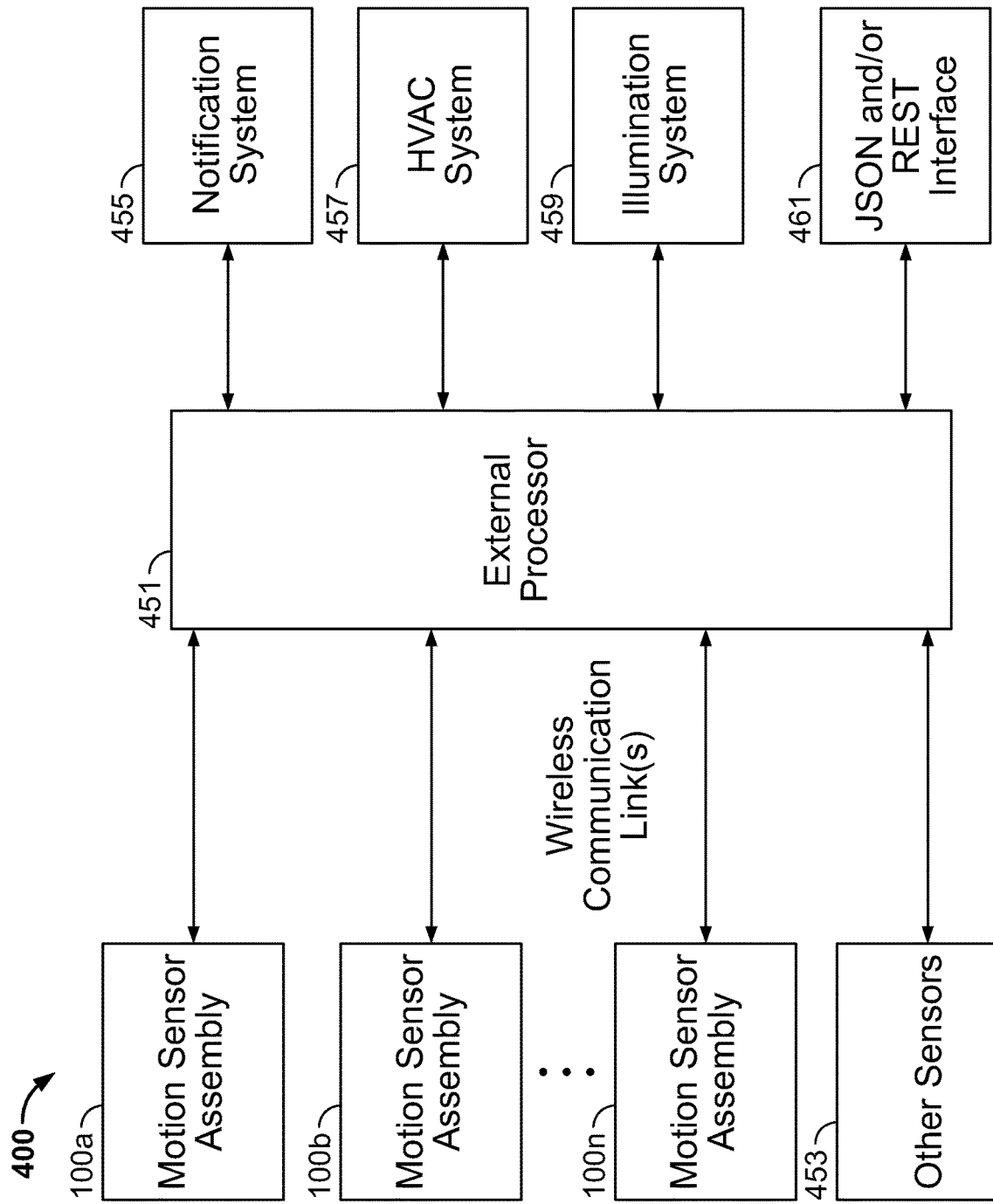
FIG. 4 is a schematic diagram of a motion sensing system including a number of motion sensor assemblies similar to those of FIGS. 1A and 1B.

FIG. 4 is a schematic diagram of a motion sensing system 400 that includes a number of motion sensor assemblies 100a-n. An external processor 451 may be in wireless communication with the motion sensor assemblies 100a-n, as well as other sensors 453. The external processor 451 may receive and process information from the sensors. The external processor 451 may also be in communication with a number of other systems and interfaces allowing for transmission of information and control of appliances or other features based on readings from the sensors. These systems may include a notification system 455, an HVAC system 457, an illumination system 459, and a representational state transfer (REST) mechanism and/or a Javascript object notation (JSON) interface 461.

In some embodiments, the other sensors 453 may include a digital camera sensor. A digital camera may also be one of the additional sensors 239 which are integrated with the motion sensor assembly 100. The camera's shutter may be triggered by a motion event. In such cases, the camera remains in a low power state until the camera's shutter may be triggered. Once triggered, the camera may take one image frame, or more than one image frame forming a segment of video. The digital camera's output may be transmitted (using any of the previously disclosed wireless communication techniques) from the motion sensor assembly 100 to an external processor 451. In some embodiments, the image or video segment acquired by the camera may be displayed to a user in response to an alert arising from the detection of a valid motion event.

Figure 5:
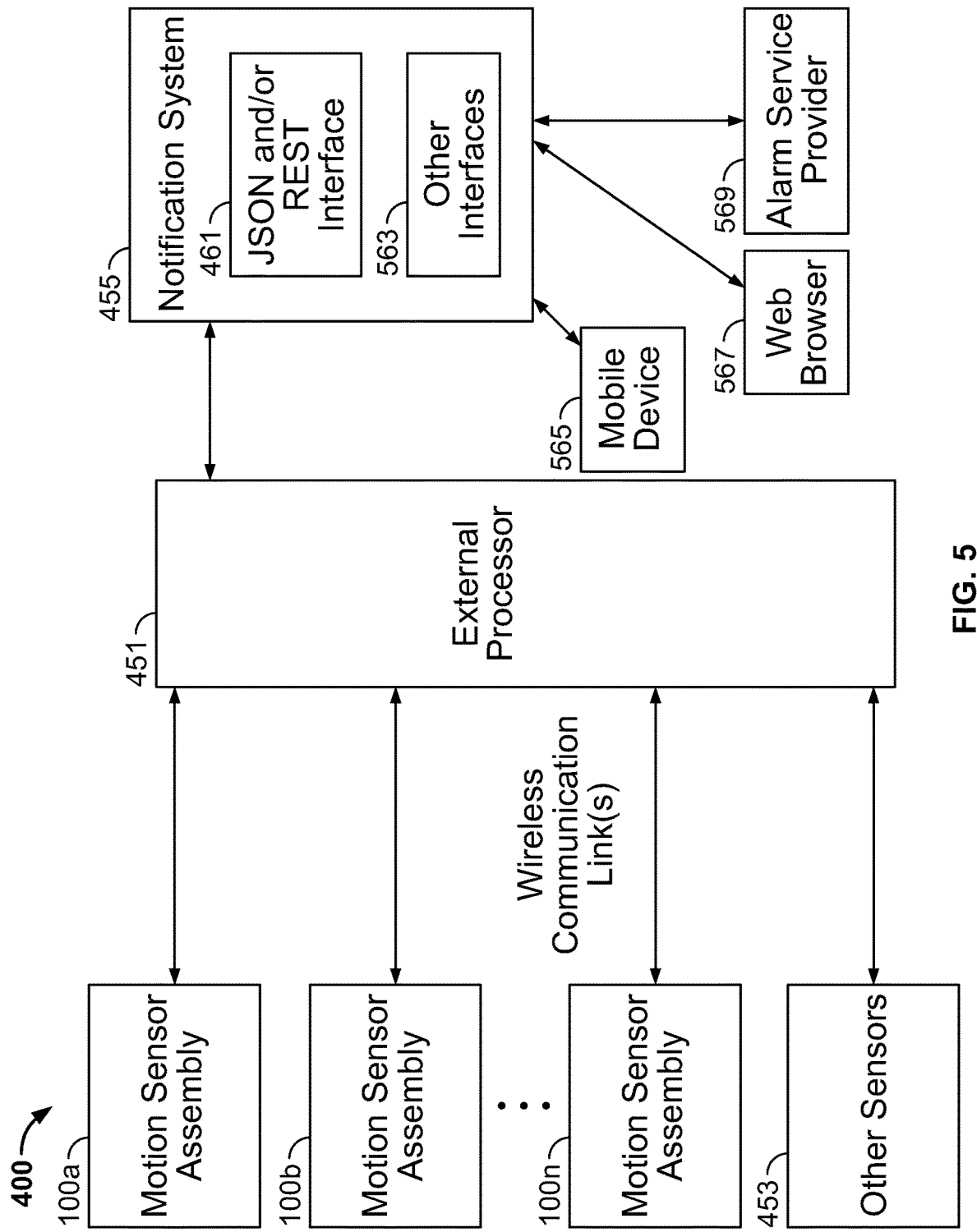
FIG. 5 is a schematic diagram of a notification control implementation of a motion sensing system including a number of motion sensor assemblies similar to those of FIGS. 1A and 1B.

FIG. 5 is a schematic diagram of a notification control implementation of a motion sensing system 400. The notification system 455 in communication with the external processor 451 may include a JSON and/or REST interface 461 and optionally other interfaces 563. The notification system 455 may be in communication with a mobile device 565, a web browser 567, and/or an alarm service provider 569. In some embodiments, valid motion events may trigger certain actions. For example, these actions may include one or more of the following communications: (1) sending a short message service (SMS) text message to a configurable number of users indicating that a valid motion event has been detected and optionally indicating a name of a location affected, (2) posting a message on a social media service such as Facebook or Twitter (e.g., via web browser 567) indicating that a valid motion event has been detected and optionally indicating a name of a location affected, (3) sending a push notification message to the mobile device(s) 565 of a configurable number of users indicating that a valid motion event has been detected and optionally indicating a name of a location affected, (4) communicating with at least one software application ("app") running on the mobile device 565 (e.g., a smartphone) to provide that application with a message indicating that a valid motion event has been detected and optionally indicating a name of a location affected, (5) placing a telephone call message to a configurable number of users indicating that a valid motion event has been detected and optionally indicating a name of a location affected, wherein such telephone call may include a digitally synthesized spoken message, and/or (6) sending a message to an alarm service provider 569 (configured by a user) indicating that a valid motion event has been detected and optionally indicating a name of a location affected, with the message optionally including communication between the aforementioned external processor 451 and the alarm service provider 569.

The foregoing communications may include sending one or more messages using a representational state transfer (REST) mechanism and/or a Javascript object notation (JSON) mechanism via the interface 461 to indicate that a valid motion event has been detected and optionally to indicate a name of a location affected and a user identifier that may be known in common to the external processor 451 and the alarm service provider 569. In some embodiments, the alarm service provider 569 may in turn contact a responding party, such as an emergency services provider (e.g., a police department) or another person or group selected by the owner of the motion sensing system 400 or the owner of the location where the motion sensor assembly 100 may be located. The responding party may be contacted directly by the external processor 451. In some embodiments, the responding party may be provided with information stored in a database such as a name of a location affected and a user identifier such as the name of the owner of the location of the motion sensor assembly 100 where a valid motion event has been detected.

Figure 6:
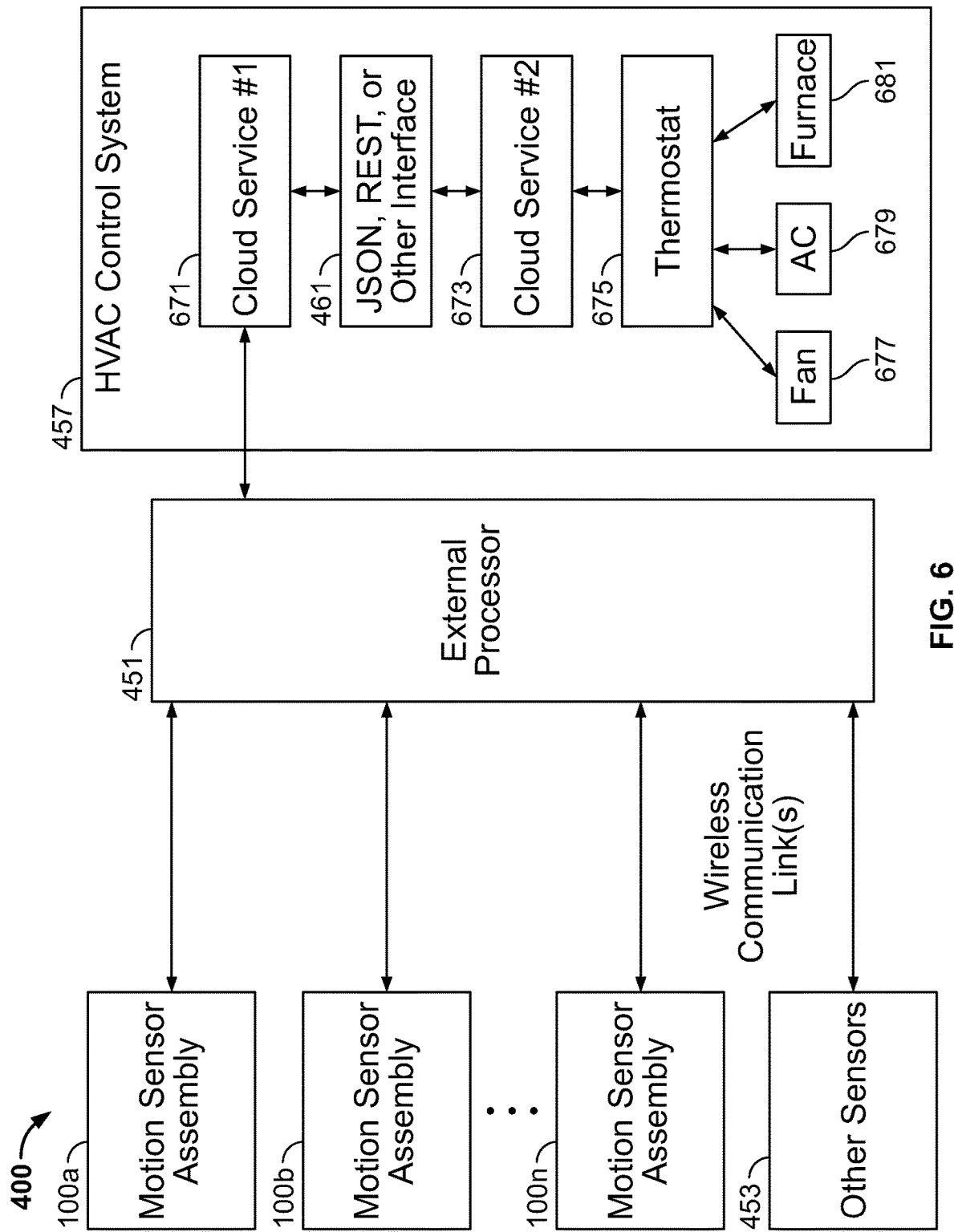
FIG. 6 is a schematic diagram of an HVAC control implementation of a motion sensing system including a number of motion sensor assemblies similar to those of FIGS. 1A and 1B.

FIG. 6 is a schematic diagram of an HVAC control implementation of the motion sensing system 400. The HVAC control system 457 includes a first cloud service 671 that serves as an intermediary between the external processor 451 and a JSON, REST, or other interface 461. A second cloud service 673 serves as an intermediary between the interface 461 and a thermostat 675, which may be in communication with a fan 677, an air conditioning (AC) system 679, and/or a furnace 681. In some embodiments, the external processor 451 communicates with, or may be a part of, an HVAC control system 457. In other embodiments, one or more motion sensor assemblies 100a-n communicate with, or are part of, the HVAC control system 457.

The HVAC control system 457 may include one or more thermostats 675. In some embodiments, the motion sensor assembly 100 may communicate directly with the HVAC control system 457 or a thermostat 675 and conveys a message indicating that a valid motion event has been detected. In other embodiments, the detection of a valid motion event may be used as an indication that one or more persons are present in a building and the HVAC system should therefore be set to a "Home" state or configuration. The operational states of the furnace 681, the air conditioner 679, the fan 677, the heat pump, and/or other HVAC components may be modified accordingly. In a particular embodiment, if no valid motion events have been detected for a predetermined period of time, the HVAC system reverts to an "Away" state or configuration and the operational states of the furnace 681, the air conditioner 679, the fan 677, the heat pump, and/or other HVAC components are modified accordingly. Representative operational states include heating, cooling, or circulating air. Further operational states may include ventilation operations such as automatically opening windows or louvers in particular spaces, either to encourage the circulation of conditioned air within certain rooms of a building, or to exchange air between certain rooms of a building with the outdoor air. In some embodiments, an air-to-air heat exchanger may be used to exchange heat among the aforementioned rooms of a building and/or with the outdoor air.

The "Home" or "Away" states described above may be determined at least in part by a model of human occupancy of a building, as with the classification or Markov chain modeling techniques previously described. In such embodiments, a classification operation may be used to determine whether a given set of valid motion events should suffice to cause a transition from the "Home" to "Away" state or vice versa. It should be understood that the terms "Home" and "Away" states are merely labels for two or more distinct states of operation and need not correspond to whether a particular person may be present or absent. Further it should be understood that the two or more distinct states of operation may apply equally to any building or structure that may be occupied by one or more persons for at least some time, whether the buildings are residential, commercial, industrial, or otherwise designated. It should also be understood that the two or more distinct states of operation may in some embodiments be chosen so as to reduce (e.g., minimize) the energy consumed by the HVAC system serving a particular building or structure.

The operational state of the HVAC control system 457 may be determined at least in part by a combination of valid motion events with one or more variables determined from one or more additional sensors 453 (such as temperature sensors, humidity sensors, water or moisture sensors, and/or barometric pressure sensors) that comprise one or more motion sensor assemblies 100. In such cases, a configurable subset of all of the motion sensor assemblies 100a-n may be used to influence the operational state of the HVAC control system 457. In some embodiments, the configurable subset may be determined by a user or an HVAC installer via a mobile device or a Web browser and may include one or more motion sensor assemblies 100 within the building or area served by the HVAC system and controlled by the HVAC control system 457. In some embodiments, a single building may contain two or more HVAC systems and one or more HVAC control systems 457. In such embodiments, a mapping between HVAC systems, HVAC system operational states, and one or more motion sensor assemblies and the motion sensors and additional sensors therein may be configured by a user or HVAC installer via a mobile device or a Web browser. In some embodiments, this mapping procedure may be coordinated by the HVAC control system 457, and in other embodiments, the mapping may be performed by the external processor 451.

The HVAC control system 457 may interface with an HVAC external processor. In such cases, the HVAC external processor may communicate with the external processor 451 of the one or more motion sensor assemblies via one or more Internet protocols, such as by sending one or more messages using a representational state transfer (REST) mechanism and/or a Javascript object notation (JSON) mechanism via interface 461 to indicate that a valid motion event has been detected and optionally indicate an identifier or name of an associated location along with the measured data from one or more additional sensors if present.

Figure 7:
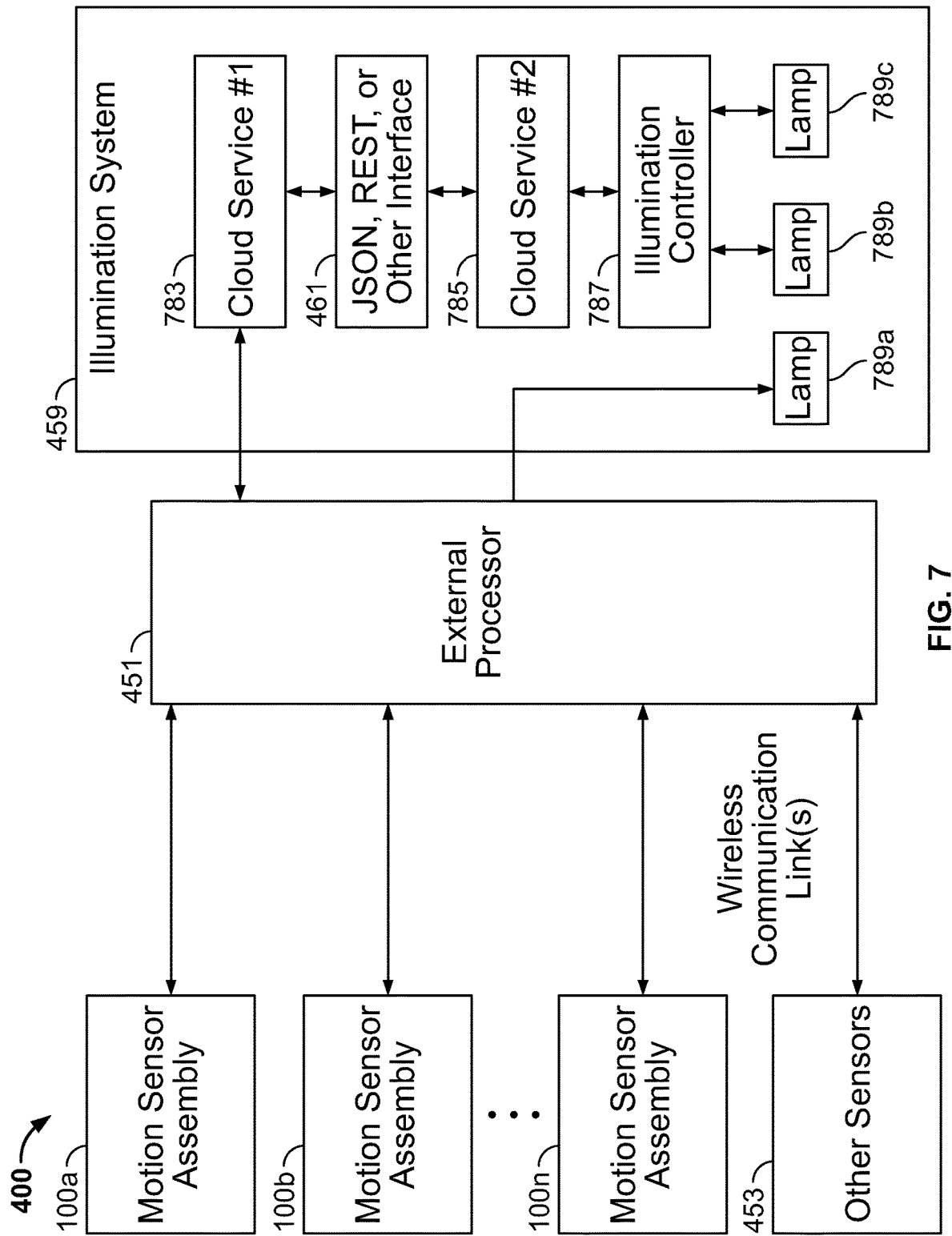
FIG. 7 is a schematic diagram of an illumination control implementation of a motion sensing system including a number of motion sensor assemblies similar to those of FIGS. 1A and 1B.

FIG. 7 is a schematic diagram of an illumination control implementation of the motion sensing system 400. One or more motion sensor assemblies may communicate with an illumination system 459 of a building or a space. The illumination system 459 includes a first cloud service 783 serving as an intermediary between the external processor 451 and a JSON, REST, or other interface 461. In some embodiments the first cloud service 783 may be co-implemented with the processor 451 in the same cloud service. A second cloud service 785 serves as an intermediary between the interface 461 and an illumination controller 787, which may be in communication with one or more lamps 789a-c. In some embodiments, the external processor 451 communicates with, or may be a part of, an illumination system 459. In other embodiments, one or more motion sensor assemblies 100a-n communicate with, or are a part of, an illumination system 459. In some embodiments, the illumination controller 787 for the illumination system 459 may be distributed among multiple processors, each co-located with a lamp 789a-c or light source. In some embodiments, the motion sensor assemblies 100a-n communicate directly with the illumination controller 787 to convey a message indicating that a valid motion event has been detected. In other embodiments, the detection of a valid motion event may be used as an indication that one or more persons are present in a building and the illumination system should therefore be set to a "Home" state or configuration and the operational state of one or more light sources are modified accordingly.

In some embodiments, if no valid motion events have been detected for a predetermined period of time, the illumination system would revert to an "Away" state or configuration and the operational state of the one or more light sources, such as lamps 789a-c, are modified accordingly. Some potential operational states may include the degree of brightness, the color, and/or the color temperature of the illumination.

In a manner generally similar to that discussed above with reference to the HVAC control system 457, an operational state of the illumination controller 787 may be determined at least in part by a combination of valid motion events with one or more variables determined from one or more additional sensors 453 (such as ambient light sensors, temperature sensors, humidity sensors, water or moisture sensors, and/or barometric pressure sensors) that comprise one or more motion sensor assemblies 100a-n. In such cases, a configurable subset of all of the motion sensor assemblies 100a-n may be used to influence the operational state of the illumination controller 787. In some embodiments, the configurable subset may be determined by a user or a lighting installer via a mobile device or a Web browser and may include one or more motion sensor assemblies within the building or area served by the illumination system controlled by the illumination controller 787. In some embodiments, a single building may contains two or more illumination systems 459 and one or more illumination controllers 787. In such embodiments, a mapping between illumination systems, illumination system operational states, and one or more motion sensor assemblies and the motion sensors and additional sensors therein may be configured by a user or lighting installer via a mobile device or a Web browser. In some embodiments, the mapping procedure may be coordinated by the illumination controller 787, and in other embodiments, the mapping procedure may be performed by the external processor 451.

The illumination system 459 may interface with an illumination external processor. In such cases, the illumination external processor may communicate with the external processor 451 of the one or more motion sensor assemblies 100a-n via one or more Internet protocols, such as by sending one or more messages using a representational state transfer (REST) mechanism and/or a Javascript object notation (JSON) mechanism via interface 461 to indicate that a valid motion event has been detected and optionally indicate an identifier or name of an associated location, along with the measured data from one or more additional sensors if present.

From the foregoing, it will be appreciated that specific embodiments have been described herein for purposes of illustration, but that various modifications may be made. For example, a number of additional cover plates may be disposed adjacent to the cover plate of the motion sensor assembly 100 so as to fit over a multiple gang electrical box. Certain aspects described in the context of particular embodiments may be combined or eliminated in other embodiments. For example, features of the HVAC control system may be combined with features of the notification system so as to alert users in response to certain HVAC control actions. Many aspects of the motion sensor assembly described in the context of FIG. 2 are equally applicable to those of FIG. 3, to the extent those aspects do not conflict with the use of the analog-to-digital converter 349 shown in FIG. 3. Further, while advantages associated with certain embodiments have been described in the context of those embodiments, other embodiments may also exhibit such advantages, and not all embodiments need necessarily exhibit such advantages to fall within the scope of the appended claims. Accordingly, the disclosure and appended claims may encompass other embodiments not expressly shown or described herein.

What is claimed is:

1. A motion sensor assembly, comprising:
a cover plate comprising a cover plate aperture that permits a portion of an electrical component in an electrical box to pass through the cover plate when the cover plate at least partially covers the electrical box;
a temperature sensor;
a motion sensor;
a communication device; and
circuitry comprising a controller, wherein:
the controller is configured to receive motion signals from the motion sensor,
the circuitry is configured to adjust a voltage window based on a temperature sensed by the temperature sensor,
the controller is configured to compare the motion signals to the voltage window that specifies a range of amplitude sensitivities,
based on the range of amplitude sensitivities, the controller is configured to cause the circuitry to reject signal amplitudes of the motion signals associated with motions of animals and accept signal amplitudes of the motion signals associated with motions of persons,
the circuitry is configured to filter frequencies associated with the motions of the animals from the motion signals to obtain filtered signals and detect movement based on the filtered signals, and
the communication device is configured to transmit an indication of the detected movement.

2. The motion sensor assembly of claim 1, wherein the cover plate aperture is sized and positioned to receive a switch of the electrical component when the cover plate covers the electrical box.

3. The motion sensor assembly of claim 1, wherein the communication device is configured to electromagnetically transmit the indication of the detected movement across an air gap to wiring powering the electrical component.

4. The motion sensor assembly of claim 1, comprising:
a circuit board to which the controller is mounted; and
a spiral antenna around an outer periphery of the circuit board; and
wherein the communication device is configured to transmit the indication of the detected movement via the spiral antenna.

5. The motion sensor assembly of claim 1, comprising:
an additional sensor; and
wherein the controller is configured to increase a frequency at which readings are obtained from the additional sensor in response to the detected movement.

6. The motion sensor assembly of claim 1, comprising:
a circuit board comprising a circuit board aperture that passes through the circuit board;
wherein the circuit board is mounted to the cover plate such that the circuit board aperture aligns with the cover plate aperture; and
the portion of the electrical component passes through the circuit board aperture when the cover plate covers the electrical box.

7. The motion sensor assembly of claim 1, comprising a circuit board, wherein:
the cover plate comprises a cover plate front side, a cover plate rear side, and a user interface element in the cover plate rear side;

the circuit board is operably coupled to the user interface element of the cover plate rear side; and the controller is mounted to the circuit board.

8. The motions sensor assembly of claim 7, wherein:
the circuit board comprises a circuit board front side adjacent the cover plate and a circuit board rear side;
wherein the circuit board rear side does not extend beyond the user interface element in the cover plate rear side.

9. A motion sensor assembly comprising:
a cover plate comprising a cover plate aperture that permits a portion of an electrical component in an electrical box to pass through the cover plate when the cover plate at least partially covers the electrical box;
a temperature sensor;
a motion sensor;
a communication device; and
circuitry comprising a processor, wherein:
the processor is configured to receive motion signals from the motion sensor,
the circuitry is configured to adjust a reference voltage based on a temperature sensed by the temperature sensor,
the processor is configured to compare the motion signals to a voltage window that specifies a range of amplitude sensitivities;
based on the range of amplitude sensitivities, the processor is configured to cause the circuitry to reject signal amplitudes of the motion signals associated with motions of animals and accept signal amplitudes of the motion signals associated with motions of persons;
the circuitry is configured to compare the motion signal to the reference voltage and signal a state change based on a relationship of the motion signal to the reference voltage, and
the communication device is configured to transmit an indication of the detected state change.

10. The motion sensor assembly of claim 9, comprising:
a lens that protrudes from a cover plate front side of the cover plate; and
wherein the motion sensor is positioned behind the lens and configured to generate the motion signals based on radiation received via the lens.

11. The motion sensor assembly of claim 10, wherein the lens is a multi-faceted lens that causes the motion sensor to vary the motion signals as an object moves across a field of view of the motion sensor and from facet to facet of the lens.

12. The motion sensor assembly of claim 10, wherein the lens is opaque to visible light and transparent to a band of infrared wavelengths.

13. The motion sensor assembly of claim 10, wherein the lens is opaque to visible light and transparent to a band of infrared wavelengths from 5 microns to 15 microns.

14. The motion sensor assembly of claim 9, wherein the processor is configured to count a number of state changes generated over a predetermined period of time and detect a movement event in response to the number of state changes exceeding a predetermined number.

15. The motion sensor assembly of claim 9, wherein the cover plate aperture is sized and positioned to receive a switch of the electrical component when the cover plate at least partially covers the electrical box.

16. A motion sensor system, comprising:
a temperature sensor; and
motion sensor assemblies, each motion sensor assembly comprising:
a cover plate comprising a cover plate aperture that permits a portion of an electrical component in an electrical box to pass through the cover plate when the cover plate at least partially covers the electrical box; and
circuitry configured to detect candidate motion events and transmit the candidate motion events to an external control system, wherein:
the circuitry is configured to compare the motion events to a voltage window that specifies a range of amplitude sensitivities;
the circuitry is configured to adjust a voltage window based on a temperature sensed by the temperature sensor;
based on the range of amplitude sensitivities, the circuitry is configured to reject signal amplitudes of the motion events associated with motions of animals and accept signal amplitudes of the motion events associated with motions of persons; and
the external control system configured to select, from candidate motion events received from each motion sensor assembly, candidate motion events that are each associated with a same time interval, and detect, based on the selected candidate motion events, a valid motion event associated with the same time interval.

17. The motion sensor system of claim 16, wherein:
a first motion sensor assembly of the motion sensor assemblies comprises an additional sensor; and
the circuitry of the first motion sensor assembly is configured to increase a frequency at which readings are obtained from the additional sensor in response detected movement.

18. The motion sensor system of claim 16, wherein the circuitry of a first motion sensor assembly of the motion sensor assemblies is configured to transmit the candidate motion events by electromagnetically transmitting the candidate motion events across an air gap to wiring powering its associated electrical component.

19. The motion sensor system of claim 16, wherein:
a first motion sensor assembly of the motion sensor assemblies comprises a spiral antenna around an outer periphery of its circuit board; and
the circuitry of the first motion sensor assembly is configured to transmit the candidate motion events via the spiral antenna.

20. The motion sensor system of claim 16, wherein:
a first motion sensor assembly of the motion sensor assemblies comprises the temperature sensor; and
the circuitry of the first motion sensor assembly is configured to detect candidate motion events based on a temperature sensed by the temperature sensor.

* * * * *